United States Patent [19]
Davies et al.

[11] Patent Number: 5,655,043
[45] Date of Patent: Aug. 5, 1997

[54] IMAGING ARRANGEMENTS

[75] Inventors: Neil Davies, Doncaster; Malcolm McCormick, Sheffield, both of Great Britain

[73] Assignee: De Montfort University, The Gateway, Great Britain

[21] Appl. No.: 416,730

[22] PCT Filed: Oct. 11, 1993

[86] PCT No.: PCT/GB93/02100

§ 371 Date: Aug. 3, 1995

§ 102(e) Date: Aug. 3, 1995

[87] PCT Pub. No.: WO94/09391

PCT Pub. Date: Apr. 28, 1994

[30] Foreign Application Priority Data

Oct. 16, 1992 [GB] United Kingdom ............. 9221813

[51] Int. Cl.[6] .................................................. G02B 6/06
[52] U.S. Cl. ........................ 385/119; 385/33; 385/121
[58] Field of Search ................................ 385/33, 34, 35, 385/115–121

[56] References Cited

U.S. PATENT DOCUMENTS

| | | | |
|---|---|---|---|
| 3,852,524 | 12/1974 | Ando et al. | 385/33 |
| 3,853,395 | 12/1974 | Yevick | 385/33 |
| 3,907,420 | 9/1975 | Yevich | 385/33 |
| 4,074,927 | 2/1978 | Kimura | 385/33 |
| 4,435,039 | 3/1984 | Lama et al. | 350/96.25 |
| 5,281,301 | 1/1994 | Basavanhally | 385/33 |
| 5,562,839 | 10/1996 | Pan | 216/26 |

FOREIGN PATENT DOCUMENTS 0260754  3/1988  European Pat. Off. .

OTHER PUBLICATIONS

King et al; Applied Optics/vol. 27, No. 10; pp. 2048–2054 May 15, 1988.
Stevenagel; Electronics Letters/vol. 27, No. 12; pp. 1022–1024 Jun. 6, 1991.

*Primary Examiner*—John Ngo
*Attorney, Agent, or Firm*—Mark D. Perdue; Robert A. Felsman

[57] ABSTRACT

An imaging arrangement has a first lens array with a focal surface and a tapered optical fiber bundle arranged with one end face coincident with the focal surface of the lens array. Another end of the bundle is coincident an optical device. The optical device may be a second lens array, an image capture device, a photographic plate, or an electronic image capture device such as a CCD array. The fiber bundle may comprise a single graded index fiber connecting the first and second lens arrays. An integral transmission screen may be provided to project a spatially inverted integral image onto the first lens array.

11 Claims, 1 Drawing Sheet

IMAGING ARRANGEMENTS

FIELD OF THE INVENTION

This invention relates to imaging arrangements and especially to integral imaging arrangements.

BACKGROUND INFORMATION

The manipulation of integral images is not straightforward and magnification (or reduction) without distortion can be problematical.

The present invention provides novel imaging arrangements which can be used to produce magnified (or reduced) integral images without distortion and which may provide for image capture.

SUMMARY OF INVENTION

The invention comprises an imaging arrangement comprising a lens array having a focal surface and an optical fibre bundle arranged with one end face coincident with the said focal surface.

The focal surface will usually comprise a focal plane.

The fibre bundle may have a second end face, and a second lens array comprising a second focal surface coincident with said second end face. Said second focal surface may comprise a second focal plane.

The fibre bundle may be coherent and connect the focal surfaces of corresponding lenses in the first and second lens arrays, and this will usually be the case for the production of regular images, though special effects could be produced with other arrangements of course.

The fibre bundle may be tapered for reduction (or magnification) of the image, though a constant cross-section bundle can be used for the transmission of integral images without reduction or magnification, for example where it is simply desired to produce an image without reduction or magnification at a location remote from an inaccessible object.

In one arrangement, multiple fibres of the bundle connect the focal surfaces of corresponding lenses of first and second lens arrays. In another arrangement, a single graded index fibre connects the focal surfaces of corresponding lenses in the first and second arrays, in which case the fibre bundle must be drawn down to the required cross section if reduction (or magnification) is required and must be of a particular length (dependent on the way the index is graded) to keep the image on the end face.

Instead of being connected to a second lens array, the second end of the fibre bundle may be adapted to be contacted by an image capture device, which may be photographic plate or an electronic image capture device such as a high resolution CCD array. Such an arrangement may comprise an integral transmission screen arranged to project a spatially inverted integral image on to the said lens array. If the captured image (after development and printing in the case of the photographic plate or electronic display in the case of the CCD-captured image) is overlaid by a lens array of appropriate dimension, an orthoscopic, three-dimensional integral image (without lens distortion) will be seen.

BRIEF DESCRIPTION OF THE DRAWINGS

Embodiments of imaging arrangements according to the invention will now be described with reference to the accompanying drawings, in which.

DETAILED DESCRIPTION

The drawings illustrate imaging arrangements comprising lens arrays 11 having a focal surface 12 and an optical fibre bundle 13 arranged with one end 14 coincident with the said focal surface 12.

In each case, the focal surface 12 comprises a focal plane, though it is conceivable that the lens array could be generally curved either uniaxially or biaxially so that the focal surface 12 could be cylindrical or spherical for example.

The lens arrays 11 are two-dimensional so-called microlens arrays in which each lens is of millimetre dimensions. Each lens forms a complete image of the object, all from slightly different points of view, and the array thus captures sufficient parallax information to be able to produce an integral, three-dimensional image of the object.

Figure 1:
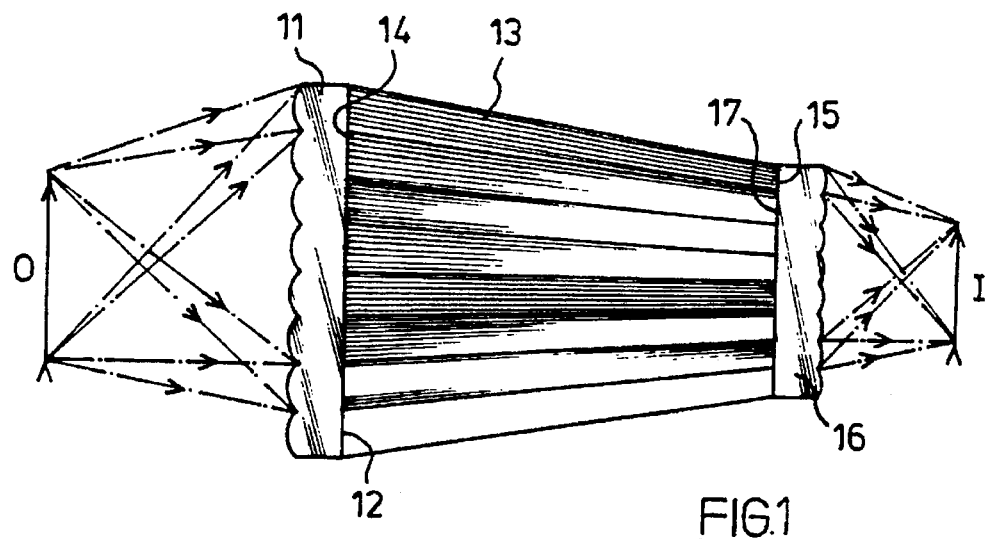
FIG. 1 is a cross-section through a first arrangement.
Figure 2:
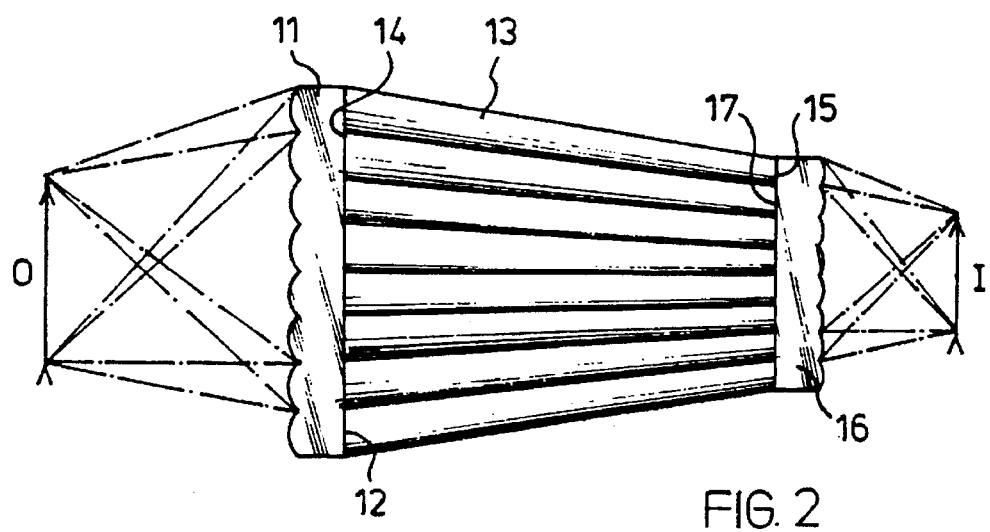
FIG. 2 is a cross-section through a second arrangement.

In the embodiments of FIGS. 1 and 2, the fibre bundle 13 has a second end face 15 and a second lens array 16 comprises a second focal surface 17 coincident with said second end face 15. Said second focal surface 17 comprises a second focal plane, but, as before, the surface 17 may be other than planar. The use of non-planar surfaces for the focal surfaces 12,17 may give special imaging effects.

The fibre bundle 13 is coherent and connects the focal surfaces. 12,17 of corresponding lenses in the first and second arrays 11,16. The fibre bundles 13 in each embodiment are shown in the drawings as being tapered, and this will result in reduction of the size of image I as compared to object O. The arrangement works in reverse, of course (in the embodiments of FIGS. 1 and 2) and would then produce a magnified image. If the lens arrays 11,16 were of identical size, so that the fibre bundle 13 was not tapered, then there would be no magnification or reduction.

Any reduction or magnification is constant throughout the whole of the image, provided, of course, that the pitch and dimensions of the microlens arrays 11,16 are matched by the tapering of the fibre bundle 13. If the array area is reduced by a factor, say, of 4 and the microlens areas are also reduced by the same factor, an object at 4 m distance will be imaged at 1 m and an object at 2 m imaged at 0.5 m; this applies equally to lateral magnification.

In the embodiment of FIG. 1, each microlens in array 11 is connected to its counterpart in array 16 by a coherent bundle of fibres which covers the total area of the sub-lens focal surface 12,17, the fibres being disposed correspondingly on the two focal surfaces. The fibre bundle is drawn down to reduce its cross-section.

In the embodiment of FIG. 2, a single fibre connects corresponding microlenses in the two arrays 11,16 which is a tapered, graded index fibre. In this case, the length of the fibre must be correlated with the taper and grading to produce the image on the end face 15.

Figure 3:
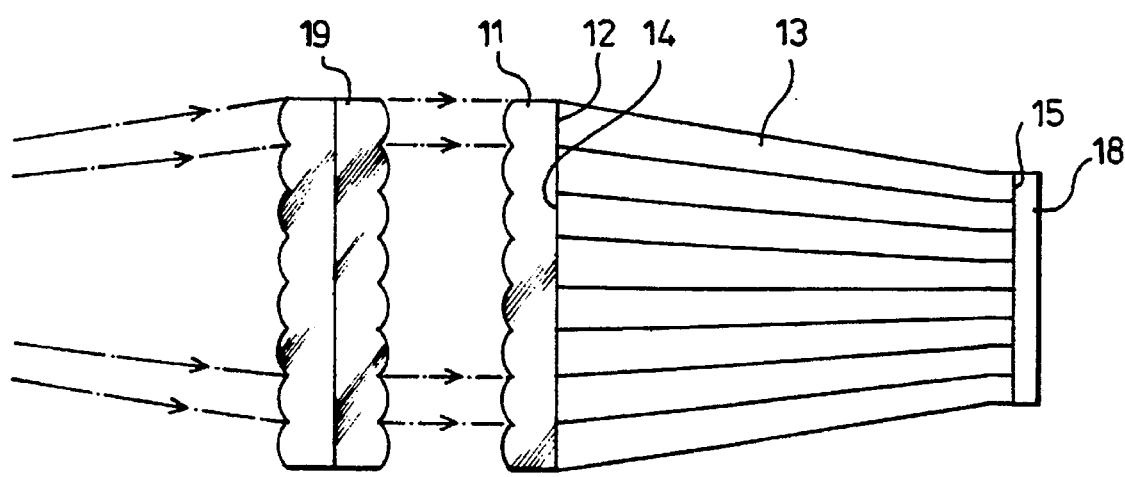
FIG. 3 is a cross-section through a third arrangement.

FIG. 3 illustrates an imaging arrangement in which the second end face 15 of the fibre bundle 13 is adapted to be contacted by an image capture device 18 such as a photographic plate or film or a high-resolution CCD array. A photographic or video camera can be constructed by the addition of appropriate shutter or other arrangements. An integral transmission screen 19 placed in front of the array 11 projects a spatially inverted integral image on to the array 11. If a CCD array is used, the resolution should be such that there is a sub-array of pixel imaging devices under the fibre or fibre bundle from each lens of the array 11 so that the microimage thereby produced can be resolved. The same consideration applies, of course, to the grain of a photographic plate or film.

When the captured image is recreated, as by developing and printing the photographic plate or film or by displaying the CCD-array information on a monitor, an orthoscopic, three-dimensional image can be seen by overlaying the print or monitor screen by a microlens array of appropriate area and pitch.

We claim:

1. An imaging arrangement comprising:
   a first lens array having a focal surface;
   a tapered optical fibre bundle arranged with one end face coincident with the focal surface of the lens array and another end of the tapered fibre bundle coincident an optical device.

2. An imaging arrangement according to claim 1, in which the focal surface comprises a focal plane.

3. An imaging arrangement according to claim 1, in which the tapered fibre bundle has a second end face, and the optical device is a second lens array that comprises a second focal surface coincident with said second end face.

4. An imaging arrangement according to claim 3, in which said second focal surface comprises a second focal plane.

5. An imaging arrangement according to claim 3, in which the fibre bundle is coherent and connects the focal surfaces of corresponding lenses in the first and second lens arrays.

6. An imaging arrangement according to claim 3, in which multiple fibres of the bundle connect the focal surfaces of corresponding lenses of first and second lens arrays.

7. An imaging arrangement according to claim 3, in which a single graded index fibre connects the focal surfaces of corresponding lenses in the first and second arrays.

8. An imaging arrangement according to claim 1, in which the fibre bundle has a second end face adapted to be contacted by an image capture device.

9. An imaging arrangement according to claim 8, in which said image capture device comprises a photographic plate.

10. An imaging arrangement according to claim 8, in which said image capture device comprises an electronic image capture device such as a high resolution CCD array.

11. An imaging arrangement according to any one of claims 8 to 10, comprising an integral transmission screen arranged to project a spatially inverted integral image on to the said first lens array.

* * * * *